June 4, 1974  H. K. BJORKMAN, JR  3,814,630

FILTER/STORE FOR ELECTRIC ENERGY STORAGE DEVICE

Filed Nov. 18, 1971  2 Sheets-Sheet 1

INVENTOR.
Harry K. Bjorkman, Jr.
BY
James Dickey + Pierce
ATTORNEYS.

June 4, 1974  H. K. BJORKMAN, JR  3,814,630
FILTER/STORE FOR ELECTRIC ENERGY STORAGE DEVICE
Filed Nov. 18, 1971.  2 Sheets-Sheet 2
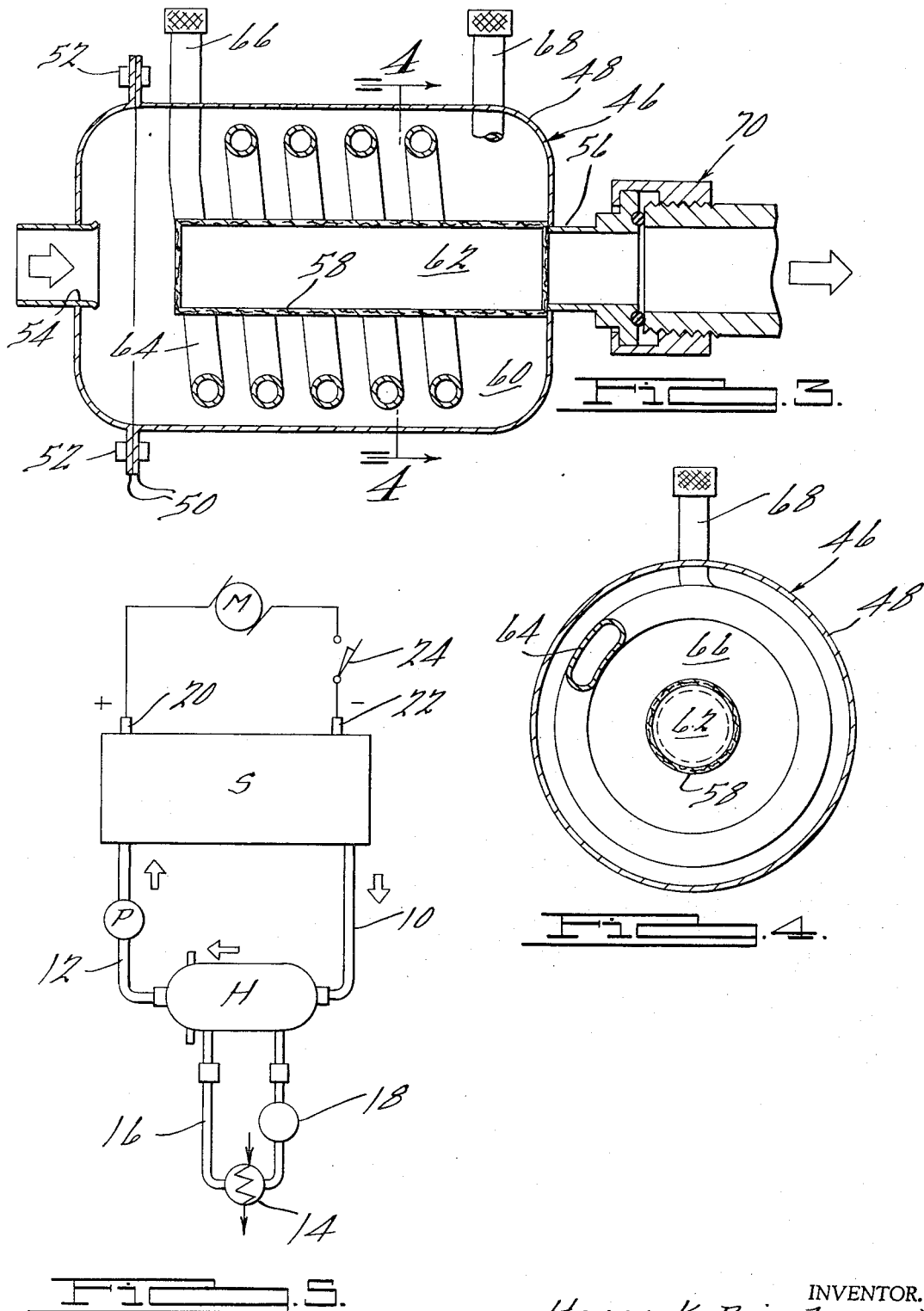
INVENTOR.
Harry K. Bjorkman, Jr.

United States Patent Office 3,814,630
Patented June 4, 1974

3,814,630
FILTER/STORE FOR ELECTRIC ENERGY STORAGE DEVICE
Harry K. Bjorkman, Jr., Birmingham, Mich., assignor to Occidental Energy Development Company, Madison Heights, Mich.
Filed Nov. 18, 1971, Ser. No. 200,066
Int. Cl. H01m 27/14, 29/04
U.S. Cl. 136—86 A          9 Claims

ABSTRACT OF THE DISCLOSURE

An electrical energy storage battery comprising an electrolytic cell through which an aqueous electrolyte is circulated and which is connected to a storage chamber having a filter therein for filtering and storing a supply of halogen hydrate. The halogen hydrate is adapted to progressively decompose during the electrical discharge of the storage battery, effecting thereby a replenishment of the quantity of halogen consumed in the electrolytic cell.

BACKGROUND OF THE INVENTION

The present invention is applicable to electrical energy storage devices which have been classified as high energy density (H.E.D.) storage batteries due to their compactness and capability of supplying at least about 50 watt hours of electric power per pound of battery weight. Storage batteries of the H.E.D. type have been found eminently satisfactory for use in both stationary and mobile electric power systems as the principal as well as a backup source of electrical energy. A breakthrough in the technology of H.E.D. secondary batteries was recently made with the advent of an electrical storage system employing a halogen hydrate in combination with an aqueous electrolyte containing a dissolved metal halide salt disposed in communicative contact with at least one pair of electrodes in an electrolytic cell. In accordance with the operation of this improved electrical storage system, the halogen produced as the result of the progressive decomposition of the halogen hydrate is reduced at the normally positive electrode in the cell, while an oxidizable metal disposed in electrical contact with a normally negative cell is oxidized during an electrical discharge of the storage battery. The specific details of the foregoing electrical storage device are described in U.S. patent application Ser. No. 50,054, filed June 26, 1970, now U.S. Pat. 3,713,888, and entitled "Halogen Hydrates." The teachings of the aforementioned United States patent application, which is owned by the assignee of the present invention, are incorporated herein by reference.

A problem continuously associated with secondary-type storage batteries heretofore known in the art, including the improved electrical storage device described in the aforementioned United States patent application, is the difficulty encountered in effecting a refueling or recharging of such electrical storage devices to a fully-charged condition. The present invention provides a storage reservoir which incorporates filtration means therein for storing a supply of halogen hydrate for use during discharge of the battery and for facilitating a replenishment in the supply thereof either during a recharging of the battery or by direct physical replenishment from a source exterior to the battery system.

SUMMARY OF THE INVENTION

The benefits and advantages of the present invention are achieved by a tank or receptacle defining a storage chamber formed with an inlet and with an outlet which are adapted to be connected to a conduit system through which an aqueous metal halide electrolyte is circulated. The electrolyte recirculation system is disposed in communication with an electrolytic cell incorporating a normally positive electrode for reducing a halogen adapted to be disposed in electrical contact therewith and a normally negative electrode for oxidizing an oxidizable metal adapted to be disposed in electrical contact therewith during the normal discharge of said cell. A replenishment of the supply of elemental halogen at the normally positive electrode is accomplished by a progressive decomposition of the halogen hydrate in the storage chamber which is carried by the electrolyte into the cell. The storage chamber is further provided with a filter disposed between the inlet and outlet thereof which allows for passage of the electrolyte through the chamber but effects a retention of halogen hydrate particles within the chamber above a preselected size range.

In one embodiment of the present invention, the storage chamber is operative to extract particles of halogen hydrate suspended in the form of a slurry in the aqueous electrolyte which is formed during a recharging cycle of the electrical energy storage device. In accordance with an alternative embodiment, the storage chamber is removably connected in the storage device and is adapted to be replaced with a filled storage chamber which is filled with halogen hydrate at a halogen hydrate formation station remote from the electrical storage device. A further embodiment involves the provision of heat transfer means within the storage chamber for supplying heat to the halogen hydrate therein to facilitate a decomposition thereof during the discharge of the electrical storage device or, alternatively, for extracting heat from the storage chamber to facilitate a formation of the halogen hydrate from the elemental halogen and water present therein which subsequently is extracted by the filter medium within the chamber.

Still other advantages and benefits of the present invention will become apparent upon a reading of the description of the preferred embodiments taken in conjunction with the accompanying drawings.

BRIEF DESCRIPTION OF THE DRAWINGS

FIG. 3 is a longitudinal vertical sectional view taken through a storage chamber constructed in accordance with an alternative embodiment of the present invention;

FIG. 4 is a transverse vertical sectional view of the storage chamber shown in FIG. 3, and taken substantially along the line 4—4 thereof; and FIG. 5 is a schematic layout of the electrical energy storage system including a halogen hydrate storage chamber in accordance with a preferred practice of the present invention.

DESCRIPTION OF THE PREFERRED EMBODIMENTS

Figure 1:
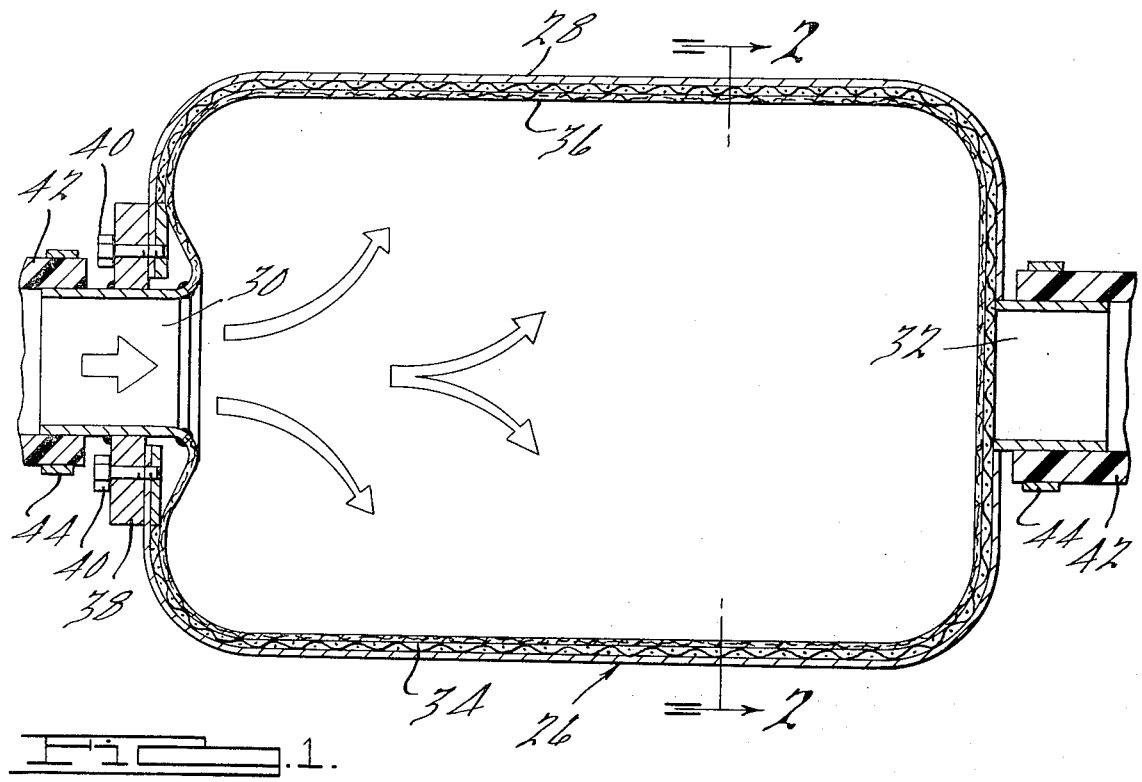
FIG. 1 is a longitudinal vertical sectional view of a storage chamber constructed in accordance with one of the embodiments of the present invention.

Referring now in detail to the drawings and as may be best seen in FIG. 5, a typical closed system of the electrical energy storage device comprises an electrode area or stack, indicated at S, which is comprised of one and more conventionally a plurality of individual electrolytic cells, each of which is comprised of a normally positive electrode and a normally negative electrode. The interior of the cell is disposed in communication with a hydrate storage area, indicated at H, by means of an inlet conduit 10 and an outlet conduit 12, the latter including a pump P for facilitating a circulation of the electrolyte through the electrode stack S and then back through the storage area H to effect a replenishment of the halogen gas consumed in the cell.

A replenishment of the halogen in the electrolyte as the result of its reduction at the normally positive electrode during a normal discharge of the electrical storage device is achieved by a progressive decomposition of a halogen hydrate stored in the storage area H to elemental halogen and water which is conveyed via the recirculated electrolyte to the electrode stack area S. Since the decomposition of the halogen hydrate is endothermic, it is usually desirable, as shown in FIG. 5, to provide a heat exchanger, indicated at 14, which is coupled to the hydrate storage area H by means of a pipe 16 through which a suitable heat exchange fluid is adapted to be circulated such as by means of a pump 18. The heat exchanger 14 can also serve to extract heat from the storage area H during a charging cycle of the electrical storage device during which a formation of halogen hydrate occurs and which comprises an exothermic reaction. As will be further noted in FIG. 5, a positive terminal 20 and a negative terminal 22 of the stack S are adapted to be electrically connected to a suitable load, such as a motor M, by means of a circuit incorporating a selectively actuable switch 24.

The foregoing system is representative of those that can be successfully employed for use in an oxidizable metal/halogen hydrate electrical energy storage device of the type to which the present invention is applicable. Systems of this type include a liquid electrolyte comprising a solution containing a dissolved metal halide salt and a dissolved and/or entrained halogen gas which is adapted to be reduced upon coming in electrical contact with the normally positive electrode in the cell during discharge of the storage battery. The liquid electrolyte may also incorporate other additives and ingredients for the purpose of providing controlled variations in the physical and chemical properties thereof for attaining optimum efficiency of operation over a broad range of conditions.

In a preferred form of the present invention, the electrolyte is comprised of an aqueous solution which may contain from as little as about 0.1% by weight up to a saturated solution concentration of a metal halide consisting of metals selected from the group consisting of Group VIII of the Periodic Chart (namely: Fe, Co, Ni, Ru, Rh, Pd, Os, Ir and Pt), metals of the Lanthanum Series (namely: Ce, Pr, Nd, Pm, Sm, Eu, Gd, Tb, Dy, Ho, Er, Tm, Yb and Lu), and Actinium Series (namely: Th, Pa, U, Np, Pu, Am, Cm, Bk and Cf), in addition to Zn, Sc, Ti, V, Cr, Mn, Cu, Ga, Y, Zr, Nb, Mo, Tc, Ag, Cd, In, Sn, Hf, Ta, W, Re, Au, Hg, Tl, Pb, Bi, Li, K, Na, Rb, Cs, Be, Mg, Ca, Sr and Ba. Those metals which react with water may be alloyed to induce stability, such as amalgams (solutions in mercury). Of the foregoing metals, zinc constitutes the most preferred metal, while iron, cobalt and nickel are preferable to the remaining enumerated metals. The foregoing metals comprise the oxidizable metals which are adapted to be disposed in electrical contact with the normally negative electrode of the electrical storage device during a discharge thereof, whereby they progressively become oxidized and enter the solution as the corresponding metal ion.

The halogen constituent employed in the electrochemical reaction preferably comprises chlorine or bromine of which chlorine and the corresponding metal chloride salts thereof constitute the preferred embodiment. Chloride salts of the afore-enumerated preferred metals and particularly zinc chloride utilizing an aqueous zinc chloride electrolyte comprise a preferred embodiment of the present invention.

Although concentrations of the metal halide salt as low as about 0.1% by weight in the aqueous electrolyte can be employed, it is usually preferred that the concentration of the metal halide be of a magnitude at least about 5% to 50%, and preferably from about 10% up to about 35% by weight. In those situations in which zinc chloride is employed as the metal halide, a maximum conductivity of the electrolyte is attained at metal halide concentrations of about 25% by weight in an aqueous electrolyte. Accordingly, in an electrical storage device utlizing zinc as the oxidizable metal and chlorine hydrate as the source for elemental chlorine, it is usually preferred that the aqueous electrolyte contain a concentration ranging from about 10% to about 35% by weight zinc chloride.

The electrochemical reaction which occurs during a normal discharge of the electrical storage device is set forth in the following equations:

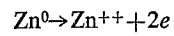

$$Zn^0 \rightarrow Zn^{++} + 2e$$

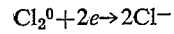

$$Cl_2^0 + 2e \rightarrow 2Cl^-$$

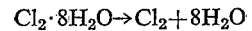

$$Cl_2 \cdot 8H_2O \rightarrow Cl_2 + 8H_2O$$

As will be noted from the foregoing equations, a replenishment of the elemental chlorine as it is reduced to the chloride ion at the normally positive electrode is accomplished by a progressive decomposition of chlorine hydrate. At the same time, the oxidizable metallic zinc is progressively oxidized at the normally negative electrode and enters the electrolyte in the soluble form as the zinc ion. As will be noted, the decomposition of the chlorine hydrate, which is somewhat analogous to "melting" of ice, results in the liberation of eight molecules of water which also is added to the electrolyte and this dilution of the electrolyte serves to offset the increased quantity of metal halide added thereto so that the concentration of the metal halide salt in the electrolyte remains reasonably constant throughout the electrical discharge phase of the storage battery.

The progressive discharge of the storage device accompanied by a progressive decomposition of the halogen hydrate does, however, produce a progressive increase in electrolyte volume. Such increased volume beyond a predetermined amount, depending on the specific storage system employed, can be periodically withdrawn and subjected to reprocessing for recovery and extraction of the elemental oxidizable metal and the corresponding halogen hydrate. Alternatively, upon a recharging of the battery in situ, the progressive conversion of dissolved metal halide salts into the corresponding elemental metal and halogen results in a progressive reduction in the volume of the electrolyte as water is consumed in the formation of the halogen hydrate.

Regardless of the specific oxidizable metal being used and the number of cells in the electrode stack, the crux of the operation of the electrical energy storage devices resides in a replenishment of the halogen constituent by utilizing a normally solid halogen hydrate stored in the storage chamber H (FIG. 5) which upon decomposition also adds water to the electrolyte, thereby maintaining the concentration of metal halide substantially constant. The rate of decomposition of the halogen hydrate is in part governed by the quantity of heat applied to influence the reaction equilibrium toward decomposition of the hydrate which is an endothermic reaction. It is also desirable during the decomposition of the halogen hydrate that particles above a preselected size are not permitted to become entrained in the electrolyte as it is circulated through the electrolytic cells since in some instances the presence of such large particles interferes with the attainment of optimum flow patterns and a corresponding reduction in the efficiency of the cell.

The storage chamber or tank, as subsequently to be described, provides an efficient means for continuously replenishing the halogen content of an electrolyte flowing therethrough and further serves to retain solid halogen hydrate particles above a preselected size within the chamber, preventing their passage into the electrode stack area. The storage chamber further provides a means for separating and extracting halogen hydrate particles introduced into the system in the form of a slurry in the aqueous electrolyte during a regeneration of the electrolyte or a recharging cycle of the storage device, whereby a progressive accumulation of regenerated halogen hydrate in the storage chamber is achieved. Such a replenishment of the supply of halogen hydrate in the storage chamber can be achieved in situ or by removing the storage chamber and connecting it to a halogen hydrate regeneration system disposed remotely of the electrical energy storage device.

Figure 2:
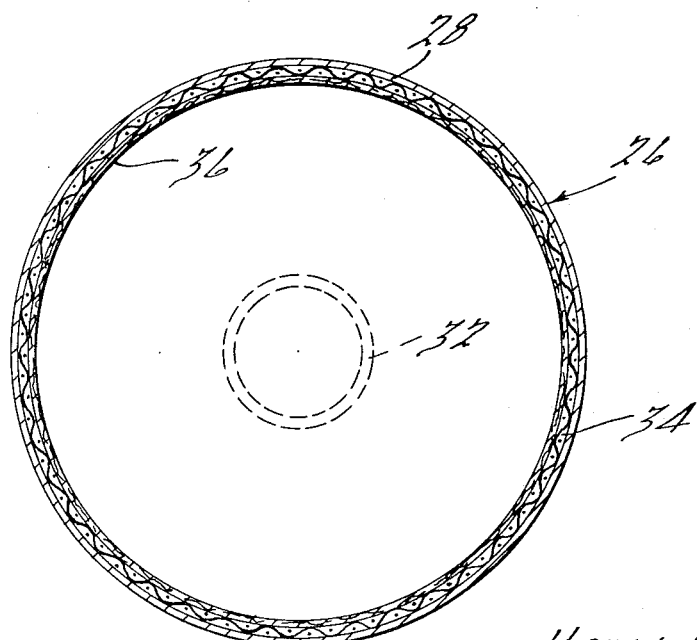
FIG. 2 is a transverse vertical sectional view through the storage chamber shown in FIG. 1, and taken substantially along the line 2—2 thereof.

Referring now in detail to FIGS. 1 and 2, a storage chamber 26 is shown which comprises a longitudinal wall of a generally circular cross section having generally convex end walls defining a cylindrical tank 28 provided with an inlet conduit 30 and an outlet conduit 32 at opposite ends thereof. A screen 34 or other substantially porous separating material is disposed in overlying relationship over substantially the entire inner surface of the cylindrical tank wall forming a porous channel through which electrolyte entering through the inlet conduit is adapted to flow toward and out through the outlet conduit 32. A generally flexible layer 36 of a filter medium is disposed in overlying relationship relative to the screen 34 and is of a porosity so as to permit passage of the electrolyte therethrough but to effect a retention of any solid halogen hydrate particles above a preselected particle size. As will be noted, the filter layer 36 may be conveniently formed in the configuration of a bag having a size corresponding substantially to that of the interior of the cylindrical tank 28 and being of a flexible property so as to conform to the general interior configuration thereof. The inlet end of the filter bag may be conveniently provided with an opening corresponding to the size of the inner end of the inlet conduit 30 and may be adhered or otherwise bonded thereto by means of a suitable adhesive which is resistant to the electrolyte passing therethrough.

Among materials particularly satisfactory for use in fabricating the filter layer 36 are woven or knitted fabrics comprised of synthetic resinous materials such as polyolefins, of which polyethylene is particularly satisfactory, polytetrafluoroethylene and plasticized polyvinyl plastics. The pattern of the fabric and the depth thereof are controlled so as to form a matrix of threads or filaments which define a porous labyrinth acting as a filter medium to effect a retention of solid particles of a size greater than about 5 microns and preferably of a size greater than about 100 microns, while at the same time permitting an unrestricted flow of liquid electrolyte therethrough.

The assembly of the storage chamber 26 is facilitated by the provision of a circular flange 38 affixed at a point midway along the length of the inlet conduit 30, as is best seen in FIG. 1. The flange 38 is removably affixed to one end of the cylindrical tank 28 by means of a plurality of screws 40 positioned in equal circumferentially spaced increments around the flange and with the threaded shank end portions thereof threadably engaged in appropriate apertures provided in the end wall of the tank 28. As will be further noted in FIG. 1, attachment of the storage chamber 26 to an electrolyte circulation system can readily be achieved such as by sliding flexible hoses 42 over the ends of the inlet and outlet conduits 30, 32 and clamping the hoses therearound in liquid-tight relationship such as by means of hose clamps 44.

The storage chamber 26, upon installation in a fully filled condition, is adapted to provide for a controlled decomposition of the halogen hydrate contained therein in response to the passage of electrolyte therethrough and an entrainment of the gaseous halogen produced as the result of the decomposition reaction. The entire supply of halogen hydrate is adapted to be consumed during the course of a normal discharge of the electrical storage battery and a replenishment thereof can be achieved by simply disconnecting the storage chamber from the system and replacing it with a second storage chamber filled with a fresh supply of halogen hydrate or, alternatively, by a recharging of the storage chamber in situ such as by introducing a slurry comprised of electrolyte containing particles of halogen hydrate suspended therein. As the slurry flows through the storage chamber, the filter layer is operative to effect a separation and retention of the solid hydrate particles within the interior of the chamber until the chamber is substantially completely filled with a fresh supply of halogen hydrate.

An alternate satisfactory construction of a storage chamber is shown in FIGS. 3 and 4. A storage reservoir 46 is shown which also comprises an elongated tank 48 of a generally circular cross section and having a pair of convex end walls disposed in opposed relationship. The circular cylindrical wall of the tank 48 is formed with a pair of radially extending flanges 50 which are removably secured together by means of a plurality of fasteners 52 extending therearound. A removal of the fasteners 52 provides for access to the interior of the storage reservoir for the purposes and in a manner as subsequently to be described.

One of the end walls of the tank is provided with an inlet conduit 54 for supplying an electrolyte or a slurry of electrolyte containing particulated halogen hydrate into the interior of the reservoir. The opposite end wall is formed with an outlet conduit 56 which is disposed in communication with the interior of a tubular filter 58 which extends inwardly of the interior of the tank 48 to a point spaced from the inlet conduit 54 opposite thereto. The tubular filter and the inner wall of the tank 48 define an annular chamber 60 which is adapted to be filled with a supply of halogen hydrate and an inner chamber 62 for receiving the electrolyte passing through the tubular filter and for conveyance thereof out through the outlet conduit 56. The tubular filter 58 may comprise a suitable unitary porous filter medium of sufficient structural strength in and of itself or, alternatively, may comprise a suitable cylindrical support such as a wire mesh screen (not shown) over which a suitable filter medium is disposed in supported relationship. In this latter regard, the tubular filter 58 may be comprised of the same materials utilized for the screen 34 and filter layer 36 of the storage chamber 26 shown in FIGS. 1 and 2.

The storage reservoir 46, as shown in FIGS. 3 and 4, is also provided with a heat exchanger coil 64 extending longitudinally of the annular chamber 60 and substantially concentric with respect to the tubular filter 58. The heat exchanger coil 64 terminates in an inlet tube 66 and an outlet tube 68 which are adapted to be connected to a suitable source of a heat exchanger fluid for circulation through the coil, effecting thereby an appropriate extraction or addition of heat to the halogen hydrate/electrolyte within the storage reservoir. In installations in which the storage reservoir 46 is removably connected to the electrolyte recirculation system of an electrical energy storage battery, the inlet and outlet conduits 54, 56 may suitably be provided with quick disconnect fittings 70 for facilitating replacement thereof from time to time. Examples of such quick disconnect fittings are unions, having a suitable gas seal, such as, a screw with a matting gas tight seal, a flange with a matting gas tight seal or a snap lock joint.

Regardless of the shape of the storage chamber, it should be capable of withstanding pressure from about 5 to 100 p.s.i.g. (pound/sq. in gauge). At a pressure of 5–10 p.s.i.g., the chlorine hydrate produced and stored contains 15–18% chlorine. At 30–80 p.s.i.g., the chlorine concentration of the stored chlorine hydrate ranges from about 17–20% by weight.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. In an electrical energy storage system, the combination comprising at least one cell comprised of a normally positive electrode for reducing a halogen disposed in electrical contact therewith and a normally negative electrode for oxidizing an oxidizable metal adapted to be disposed in electrical contact therewith during an electrical discharge of said cell, a storage chamber means formed with an inlet and an outlet and adapted to contain a quantity of halogen hydrate, an aqueous metal halide electrolyte, circulating means for circulating said electrolyte between said cell and through said storage chamber means to effect a progressive decomposition of said halogen hydrate therein and to replenish the quantity of halogen reduced at said positive electrode during a normal discharge of said cell, the improvement of which comprises a porous filter means interposed in said storage chamber means between said inlet and said outlet, allowing passage of said electrolyte therethrough and a retention within said storage chamber means of halogen hydrate particles above a preselected range and a coiled heat exchange means positioned within said storage chamber means and around the porous filter means, said coiled heat transfer means adapted to control the temperature in the storage chamber means to form halogen hydrate during the charging of the system.

2. The electrical energy storage system as defined in claim 1, in which said chamber is of an elongated configuration and of a substantially circular cross section and wherein said inlet and said outlet are disposed at opposite ends thereof.

3. The electrical energy storage system as defined in claim 1, wherein said filter medium comprises a flexible porous layer disposed in overlying relationship with respect to the interior surface of said chamber, and spacer means interposed between said layer and said surface for maintaining a preselected spacing therebetween defining a channel of flow for said electrolyte toward said outlet.

4. The electrical energy storage system as defined in claim 1, wherein said filter medium is disposed in the form of a three-dimensional porous enclosure extending into the interior of said chamber and positioned with the interior of said enclosure disposed in communication with said outlet.

5. The electrical energy storage system as defined in claim 1, wherein said storage chamber is provided with connecting means at said inlet and said outlet for removably connecting said chamber to said circulating means.

6. The electrical energy storage system as defined in claim 1, wherein said filter medium comprises a flexible fabric comprised of a material chemically resistant to said electrolyte and said halogen hydrate.

7. The electrical energy storage system as defined in claim 1, wherein said filter medium comprises a fabric composed of filaments selected from the group consisting of polyolefins, polytetrafluoroethylene and polyvinyl plastics.

8. The electrical energy storage system as defined in claim 1, further including means disposed in communication with said inlet for introducing a slurry comprised of particles of said halogen hydrate dispersed in said electrolyte into said chamber for extraction and retention of said halogen hydrate by said filter medium thereby replenishing the quantity of said halogen hydrate therein.

9. The electrical energy storage system as defined in claim 1, wherein the halogen hydrate is chlorine hydrate, the electrolyte is an aqueous zinc chloride electrolyte and the oxidizable metal is zinc.

References Cited

UNITED STATES PATENTS 3,713,888   1/1973   Symons _____ 136—162

ALLEN B. CURTIS, Primary Examiner

H. A. FEELEY, Assistant Examiner